United States Patent
Zhang et al.

(10) Patent No.: US 12,323,863 B2
(45) Date of Patent: Jun. 3, 2025

(54) TECHNIQUES FOR AVOIDING FREQUENT HANDOVER IN SMALL CELLS

(71) Applicant: QUALCOMM Incorporated, San Diego, CA (US)

(72) Inventors: Hao Zhang, Shanghai (CN); Chaofeng Hui, Beijing (CN); Fojian Zhang, Shenzhen (CN); Jian Li, Shanghai (CN); Tianya Lin, Shanghai (CN); Mingyan Wang, Shanghai (CN); Jun Deng, Shanghai (CN); Peng Wu, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 17/914,752

(22) PCT Filed: May 23, 2020

(86) PCT No.: PCT/CN2020/091954
§ 371 (c)(1),
(2) Date: Sep. 26, 2022

(87) PCT Pub. No.: WO2021/237384
PCT Pub. Date: Dec. 2, 2021

(65) Prior Publication Data
US 2023/0354112 A1 Nov. 2, 2023

(51) Int. Cl.
*H04W 4/00* (2018.01)
*H04W 36/00* (2009.01)
(Continued)

(52) U.S. Cl.
CPC ....... *H04W 36/0058* (2018.08); *H04W 36/38* (2013.01); *H04W 36/362* (2023.05)

(58) Field of Classification Search
CPC .................. H04W 36/0058; H04W 36/38; H04W 36/362
See application file for complete search history.

(56) References Cited

U.S. PATENT DOCUMENTS

| | | | |
|---|---|---|---|
| 2009/0275334 A1* | 11/2009 | Xie | H04W 36/04 455/436 |
| 2010/0093358 A1* | 4/2010 | Cheong | H04W 36/0055 455/444 |

(Continued)

FOREIGN PATENT DOCUMENTS

| | | |
|---|---|---|
| EP | 2693809 A2 | 2/2014 |
| WO | WO2014176780 A1 | 11/2014 |

OTHER PUBLICATIONS

LG Electronics Inc: "How to Reduce State3 Handover Failure Rate in Macro-to-pico Handover", R2-122896, 3rd Generation Partnership Project (3GPP), Mobile Competence Centre, 650, Route Des Lucioles, F-06921 Sophia-Antipolis Cedex, France, RAN WG2, No. Prague, Czech, May 21, 2012-May 25, 2012, May 15, 2012, pp. 1-2, XP050607454, paragraph [ 002.].

(Continued)

*Primary Examiner* — Abdelnabi O Musa
(74) *Attorney, Agent, or Firm* — Holland & Hart LLP

(57) ABSTRACT

Methods, systems, and devices for wireless communications are described. A user equipment (UE) may avoid frequent handover in small cells by triggering handover to a macro cell. The UE may determine that the UE performs a number of handovers within a time period. The UE may determine to trigger a handover to the macro cell. The UE may identify the macro cell based on measuring the macro cell during multiple handovers. The UE may determine to refrain from indicating signal measurements of small cells in a measurement report. Accordingly, a measurement report may include a signal measurement of the macro cell and omit the signal measurements of the small cells. The UE may transmit the (Continued)

measurement report to the small cell acting as a serving cell for the UE. Based the measurement report, the UE may receive a message initiating a handover procedure with the macro cell.

34 Claims, 10 Drawing Sheets

(51) Int. Cl.
*H04W 36/38* (2009.01)
*H04W 36/36* (2009.01)

(56) References Cited

U.S. PATENT DOCUMENTS

| | | | |
|---|---|---|---|
| 2013/0023302 A1* | 1/2013 | Sivanesan | H04W 36/324 455/525 |
| 2013/0084849 A1* | 4/2013 | Koskinen | H04W 36/0088 455/422.1 |
| 2014/0128084 A1* | 5/2014 | Zhong | H04W 48/16 455/444 |
| 2015/0050934 A1* | 2/2015 | Jung | H04W 36/324 455/437 |
| 2016/0353347 A1* | 12/2016 | Jun | H04W 36/20 |
| 2017/0026879 A1 | 1/2017 | Fukuda | |
| 2017/0208526 A1* | 7/2017 | Madan | H04W 52/285 |
| 2019/0387440 A1 | 12/2019 | Yiu et al. | |
| 2020/0162956 A1 | 5/2020 | Cui et al. | |
| 2020/0275334 A1* | 8/2020 | Visuri | H04W 36/324 |
| 2021/0297922 A1* | 9/2021 | Bhatti | H04W 64/003 |

OTHER PUBLICATIONS

Supplementary European Search Report—EP20937974—Search Authority—Munich—Feb. 5, 2024.
International Search Report and Written Opinion—PCT/CN2020/091954—ISA/EPO—Jan. 29, 2021.

* cited by examiner

TECHNIQUES FOR AVOIDING FREQUENT HANDOVER IN SMALL CELLS

CROSS REFERENCE

The present Application for Patent claims priority to International Patent Application No. PCT/CN2020/091954 by ZHANG et al., entitled "TECHNIQUES FOR AVOIDING FREQUENT HANDOVER IN SMALL CELLS", filed May 23, 2020; which is assigned to the assignee hereof and which is incorporated by reference herein in their entirety.

FIELD OF TECHNOLOGY

The following relates generally to wireless communications and more specifically to techniques for avoiding frequent handover in small cells.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Base stations may provide communication coverage via cells. As a UE moves through an environment, a handover may be triggered to associate the UE with a cell. However, for some use cases, conventional handover techniques are deficient.

SUMMARY

The described techniques relate to improved methods, systems, devices, and apparatuses that support techniques for avoiding frequent handover in small cells. Generally, the described techniques provide for enabling a user equipment (UE) to avoid frequent handover in small cells by triggering handover to a macro cell. The macro cell may provide inferior communication coverage to the UE compared to a small cell in a geographic area of the small cell, but the communication coverage of the macro cell may be sufficient to act as a serving cell for the UE. The UE may determine that the UE performs a number of handovers within a time period. The UE may determine to trigger a handover to the macro cell rather than to continue performing handovers to small cells. The UE may identify the macro cell based on measuring the macro cell during multiple handovers. Based on at least a threshold number of handovers occurring within the time period, the UE may determine to refrain from indicating signal measurements of small cells in a measurement report to trigger the network to hand the UE over to the macro cell. Accordingly, a measurement report may include a signal measurement of the macro cell and omit the signal measurements of the small cells. The UE may transmit the measurement report to the small cell acting as a serving cell for the UE. Based the measurement report, the UE may receive a message initiating a handover procedure from the small cell to the macro cell. After performing the handover procedure, the UE may maintain a connection with the macro cell (e.g., for at least a defined amount of time), which may improve data transfer stability and power efficiency at the UE, among other benefits.

A method of wireless communication by a UE is described. The method may include identifying a number of handovers of the UE occurring within a time period, detecting a macro cell based on measuring the macro cell during a set of the handovers, generating a first signal measurement of the macro cell and a second signal measurement of a second cell, determining to omit reporting of the second signal measurement of the second cell in a measurement report based on the identifying, and transmitting the measurement report indicating the first signal measurement of the macro cell based on the determining.

An apparatus for wireless communication by a UE is described. The apparatus may include a processor, memory coupled with the processor, and instructions stored in the memory. The instructions may be executable by the processor to cause the apparatus to identify a number of handovers of the UE occurring within a time period, detect a macro cell based on measuring the macro cell during a set of the handovers, generate a first signal measurement of the macro cell and a second signal measurement of a second cell, determine to omit reporting of the second signal measurement of the second cell in a measurement report based on the identifying, and transmit the measurement report indicating the first signal measurement of the macro cell based on the determining.

Another apparatus for wireless communication by a UE is described. The apparatus may include means for identifying a number of handovers of the UE occurring within a time period, detecting a macro cell based on measuring the macro cell during a set of the handovers, generating a first signal measurement of the macro cell and a second signal measurement of a second cell, determining to omit reporting of the second signal measurement of the second cell in a measurement report based on the identifying, and transmitting the measurement report indicating the first signal measurement of the macro cell based on the determining.

A non-transitory computer-readable medium storing code for wireless communication by a UE is described. The code may include instructions executable by a processor to identify a number of handovers of the UE occurring within a time period, detect a macro cell based on measuring the macro cell during a set of the handovers, generate a first signal measurement of the macro cell and a second signal measurement of a second cell, determine to omit reporting of the second signal measurement of the second cell in a measurement report based on the identifying, and transmit the measurement report indicating the first signal measurement of the macro cell based on the determining.

Some examples of the method, apparatuses, and non-transitory computer-readable medium described herein may further include operations, features, means, or instructions for determining that the number of handovers occurring within the time period satisfies a handover threshold.

Some examples of the method, apparatuses, and non-transitory computer-readable medium described herein may further include operations, features, means, or instructions for receiving control signaling that indicates the handover threshold.

In some examples of the method, apparatuses, and non-transitory computer-readable medium described herein, detecting the macro cell may include operations, features, means, or instructions for detecting the macro cell based on measuring the macro cell during a set of the handovers that satisfy the handover threshold.

Some examples of the method, apparatuses, and non-transitory computer-readable medium described herein may further include operations, features, means, or instructions for receiving a message based on transmitting the measurement report, and performing a handover procedure with the macro cell based on receiving the message.

In some examples of the method, apparatuses, and non-transitory computer-readable medium described herein, performing the handover procedure may include operations, features, means, or instructions for establishing a link with the macro cell based on receiving the message.

In some examples of the method, apparatuses, and non-transitory computer-readable medium described herein, the message includes a radio resource control reconfiguration message.

In some examples of the method, apparatuses, and non-transitory computer-readable medium described herein, the handover procedure includes a random access procedure.

Some examples of the method, apparatuses, and non-transitory computer-readable medium described herein may further include operations, features, means, or instructions for identifying a handover threshold, a duration of the time period, or both.

Some examples of the method, apparatuses, and non-transitory computer-readable medium described herein may further include operations, features, means, or instructions for receiving control signaling indicating the handover threshold, the duration of the time period, or both.

Some examples of the method, apparatuses, and non-transitory computer-readable medium described herein may further include operations, features, means, or instructions for receiving a measurement configuration that indicates the UE may be to measure the macro cell and the second cell, where the first signal measurement and the second signal measurement may be generated based on the measurement configuration.

Some examples of the method, apparatuses, and non-transitory computer-readable medium described herein may further include operations, features, means, or instructions for identifying a reporting periodicity indicated in the measurement configuration, where the measurement report may be transmitted based on the reporting periodicity.

Some examples of the method, apparatuses, and non-transitory computer-readable medium described herein may further include operations, features, means, or instructions for detecting an event, where the measurement report may be transmitted based on detecting the event.

Some examples of the method, apparatuses, and non-transitory computer-readable medium described herein may further include operations, features, means, or instructions for receiving control signaling that indicates an event detection configuration, where the event may be detected based on the event detection configuration.

Some examples of the method, apparatuses, and non-transitory computer-readable medium described herein may further include operations, features, means, or instructions for receiving an aperiodic measurement reporting trigger, where the measurement report may be transmitted based on receiving the aperiodic measurement reporting trigger.

Some examples of the method, apparatuses, and non-transitory computer-readable medium described herein may further include operations, features, means, or instructions for determining, based on generating the first signal measurement and the second signal measurement, that at least one signal parameter associated with the macro cell may be inferior to at least one corresponding signal parameter associated with the second cell.

Some examples of the method, apparatuses, and non-transitory computer-readable medium described herein may further include operations, features, means, or instructions for determining that the at least one signal parameter associated with the macro cell satisfies a signal threshold, where determining to omit reporting of the second signal measurement of the second cell in the measurement report may be further based on determining that the at least one signal parameter associated with the macro cell satisfies the signal threshold.

In some examples of the method, apparatuses, and non-transitory computer-readable medium described herein, the first signal measurement or the second signal measurement includes a reference signal received power measurement, a signal to interference plus noise ratio measurement, or both.

In some examples of the method, apparatuses, and non-transitory computer-readable medium described herein, the second cell includes a small cell, a micro cell, or both.

DETAILED DESCRIPTION

Figure 1:
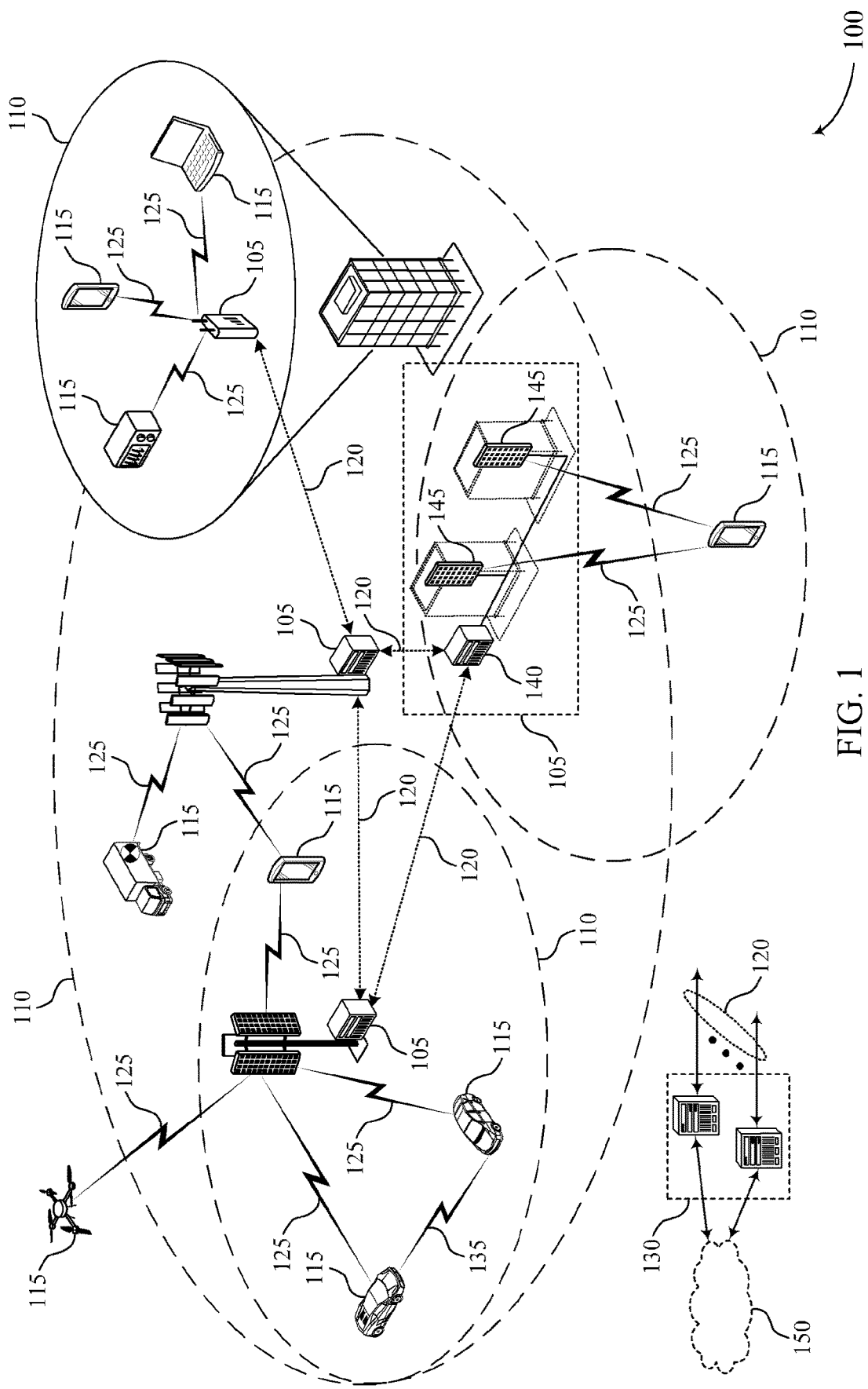
FIGS. 1 and 2 illustrate examples of wireless communications systems that support techniques for avoiding frequent handover in small cells in accordance with aspects of the present disclosure.

Some wireless communication systems, such as fifth generation (5G) systems which may be referred to as New Radio (NR) systems, may include user equipment (UE) communicating with network nodes such as base stations. Each base station may provide communication coverage for UEs via one or more cells. For example, a macro cell may provide communication coverage for a relatively large geographic area, and a small cell (which in some cases may be referred to as a micro cell) may provide communication coverage for a smaller geographic area. Small cells may be widely deployed in NR systems. In some examples, a geographic area of a macro cell may overlap with geographic areas of one or more small cells.

A UE may move from a geographic area of a first small cell to a geographic area of a second small cell, which may trigger a handover. The UE may generate one or more signal measurements for cells, for example based on receiving a trigger from the first small cell, which may act as a serving cell for the UE. The UE may transmit a measurement report indicating the signal measurements to the first small cell. Based on the measurement report, the first small cell may determine to indicate handover to the second small cell for the UE. The first small cell may transmit a message (e.g., a Radio Resource Control (RRC) reconfiguration message) to the UE initiating a handover procedure. The handover procedure may include establishing a link with the second small cell based on the message. Based on establishing the link, the second small cell may act as a serving cell for the UE.

In some examples, an area may include a quantity of small cells, which may lead to frequent handovers as a UE moves through the area. The frequent handovers may increase signaling overhead for the UE and power drain of a battery of the UE. Signal measurements and measurement reports may also reduce a data rate for the UE, which may reduce communications reliability and efficiency at the UE.

According to the techniques described herein, a UE may avoid frequent handover in small cells by triggering handover to a macro cell. The macro cell may, in some instances, provide inferior communication coverage to the UE compared to a small cell in a geographic area of the small cell, but the communication coverage of the macro cell may be sufficient to act as a serving cell for the UE. For example, the signal strength of the macro cell may satisfy a signal threshold. The UE may determine that the UE performs a number of handovers within a time period. The UE may determine to trigger a handover to the macro cell rather than continue performing handovers to small cells. The UE may identify the macro cell based on measuring the macro cell during multiple handovers, but instead is handed over from one small cell to the next.

Based on at least a threshold number of handovers occurring within the time period, the UE may determine to refrain from indicating signal measurements of small cells in a measurement report to trigger the network to hand the UE over to the macro cell. Accordingly, a measurement report may include a signal measurement of the macro cell and omit the signal measurements of the small cells. The UE may transmit the measurement report to the small cell acting as a serving cell for the UE. Based the measurement report, the UE may receive a message initiating a handover procedure with the macro cell. After performing the handover procedure, the UE may maintain a connection with the macro cell (e.g., for at least a defined amount of time), which may improve data transfer stability and power efficiency at the UE, among other benefits.

Aspects of the disclosure are initially described in the context of wireless communications systems. Aspects of the disclosure are further illustrated by and described with reference to a process flow, apparatus diagrams, system diagrams, and flowcharts that relate to techniques for avoiding frequent handover in small cells.

FIG. 1 illustrates an example of a wireless communications system 100 that supports techniques for avoiding frequent handover in small cells in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to the techniques described herein, a UE 115 may avoid frequent handover in small cells of base stations 105 by triggering handover to a macro cell of a base station 105. The macro cell may, in some examples, provide inferior communication coverage to the UE 115 compared to a small cell in a geographic coverage area 110 of the small cell, but the communication coverage of the macro cell may be sufficient to act as a serving cell for the UE 115. For example, a signal strength of the macro cell may satisfy a signal threshold but may be less than a signal strength of a small cell. The UE 115 may determine that the UE 115 performs a number of handovers within a time period. The UE 115 may determine to trigger a handover to the macro cell rather than continue performing handovers to small cells. The UE 115 may identify the macro cell based on measuring the macro cell during multiple handovers. Based on at least a threshold number of handovers occurring within the time period, the UE 115 may determine to refrain from indicating signal measurements of small cells in a measurement report to trigger the network to hand the UE over to the macro cell. Accordingly, a measurement report may include a signal measurement of the macro cell and omit the signal measurements of the small cells. The UE 115 may transmit the measurement report to the small cell acting as a serving cell for the UE 115. Based the measurement report, the UE 115 may receive a message initiating a handover procedure with the macro cell. After performing the handover procedure, the UE 115 may maintain a connection with the macro cell (e.g., for at least a defined amount of time), which may improve data transfer stability and power efficiency at the UE 115, among other benefits.

Figure 2:
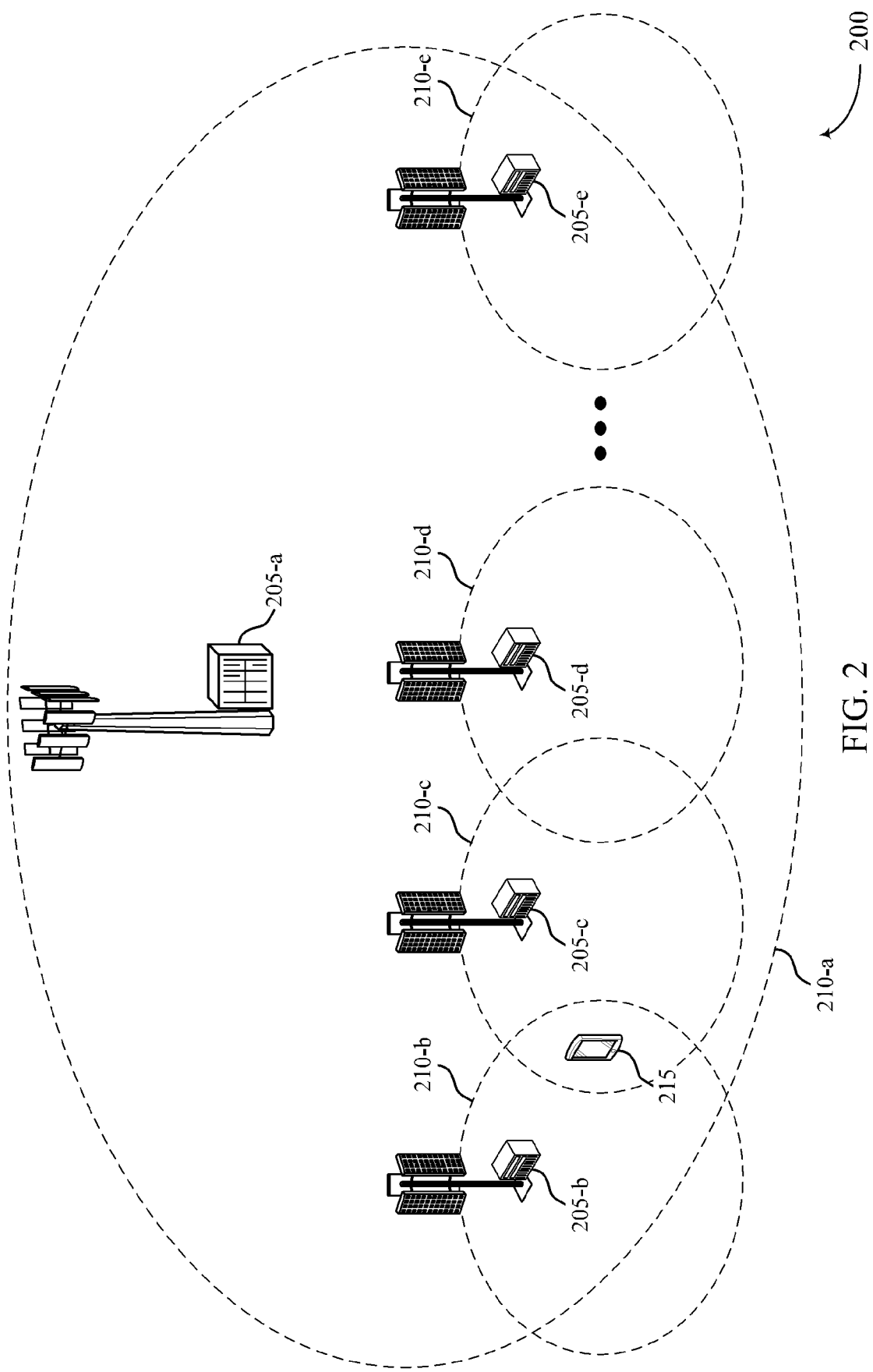

FIG. 2 illustrates an example of a wireless communications system 200 that supports techniques for avoiding frequent handover in small cells in accordance with aspects of the present disclosure. In some examples, the wireless communications system 200 may implement aspects of the wireless communication system 100. For example, the wireless communications system 200 may include base stations 205 and a UE 215, which may be examples of the corresponding devices described with reference to FIG. 1. In some examples, a set of the base stations 205 illustrated in FIG. 2 may represent components of a single base station 205, or each base station 205 may represent a distinct device.

Each base station 205 may provide communication coverage for a geographic coverage area 210. As illustrated in FIG. 2, a base station 205-*a* may provide communication coverage for a geographic coverage area 210-*a* via a macro cell, and additional base stations 205 may provide communication coverage for additional geographic coverage areas 210 via small cells. The geographic coverage area 210-*a* may overlap with the geographic coverage areas 210 of the small cells. In some examples, the signal strength of the macro cell may be inferior to the signal strength of a small cell (e.g., of a base station 205-*b*) in a geographic coverage area 210 (e.g., the geographic coverage area 210-*b*).

As the UE 215 moves through the geographic coverage areas 210, handovers may be triggered to maintain reliable service for the UE 215. For example, a small cell of the base station 205-*b* may act as a serving cell for the UE 215 when the UE is in a geographic coverage area 210-*b*. In some examples, the UE 215 may be NR capable and may operate in standalone mode. As the UE 215 enters a geographic coverage area 210-*c*, the signal strength of the base station 205-*b* may be reduced. In some examples, the UE 215 may detect an event (e.g., an A2 event) based on determining that a signal parameter associated with the communication coverage provided by the base station 205-*b* falls below a threshold. The signal parameter may include a reference signal received power (RSRP), a reference signal received quality (RSRQ), a signal to interference plus noise ratio (SINR), another signal quality parameter, or any combination thereof.

The UE 215 may generate signal measurements for one or more cells. For example, in the geographic coverage area 210-*c*, the UE 215 may generate signal measurements for the macro cell of the base station 205-*a* and the small cell of the base station 205-*c*. In some examples, the UE 215 may generate the signal measurements based on detecting the event. Additionally or alternatively, the UE 215 may be configured to periodically transmit measurement reports to the serving cell. In some examples, the UE 215 may receive, from its currently serving base station 205 (e.g., base station 205-*b*), an aperiodic measurement reporting trigger or a measurement configuration indicating the UE 215 is to generate the signal measurements, which base stations to measure, or both. The UE 215 may transmit a measurement report to the base station 205-*b* indicating the signal measurements.

Based on the signal measurements, the base station 205-*b* may determine to handover the UE 215 to the small cell of the base station 205-*c*. The base station 205-*b* may transmit a message to the UE 215 initiating a handover procedure. In some examples, the message may be an RRC reconfiguration message. Based on the message, the UE 215 may perform a handover procedure with the base station 205-*c*, which may include establishing a link with the small cell of the base station 205-*c*. In some examples, the handover procedure may include a random access procedure. Based on establishing the link, the small cell of the base station 205-*c* may act as a serving cell for the UE 215.

In some examples, as the UE 215 moves through the geographic coverage areas 210 of the small cells, frequent handovers in the small cells may increase a signaling overhead for the UE 215, which may reduce communications reliability and efficiency at the UE 215, as well as incur battery drain. The UE 215 may determine to avoid the frequent handovers by triggering a handover to the macro cell of the base station 205-*a*. The macro cell may, in some cases, provide an inferior signal strength as observed at the UE 215 compared to a small cell in a geographic coverage area 210 of the small cell, but the 205-*b* of the macro cell may be sufficient that the macro cell may act as a serving cell for the UE 215. For example, the UE 215 may determine that a signal parameter associated with the communication coverage provided by the macro cell of the base station 205-*a* satisfies a signal threshold (e.g., a signal strength threshold), even though other small cells are available. In some examples, the UE 215 may identify the macro cell of the base station 205-*a* based on generating signal measurements for the macro cell during multiple handovers.

The UE 215 may determine that the UE 215 has performed a number of handovers within a time period (e.g., 60 seconds). In some examples, the UE 215 may determine that the number of handovers exceeds a handover threshold (e.g., 5 handovers within 60 seconds). In some examples, the UE 215 may receive control signaling indicating a duration of the time period, the number of handovers threshold (e.g., a counter threshold), or both. The UE 215 may generate signal measurements for the macro cell and a small cell. The UE 215 may determine to omit reporting of the signal measurement for the small cell in a measurement report to trigger a handover to the macro cell rather than continue performing handovers to small cells. Accordingly, the UE 215 may transmit a measurement report to a serving cell (e.g., a small cell of a base station 205), where the measurement report may indicate the signal measurement of the macro cell. Based the measurement report, the UE 215 may receive a message initiating a handover procedure with the macro cell. After performing the handover procedure, the UE 215 may maintain a connection with the macro cell (e.g., for at least a defined amount of time), which may improve data transfer stability and power efficiency at the UE 215, among other benefits.

Figure 3:
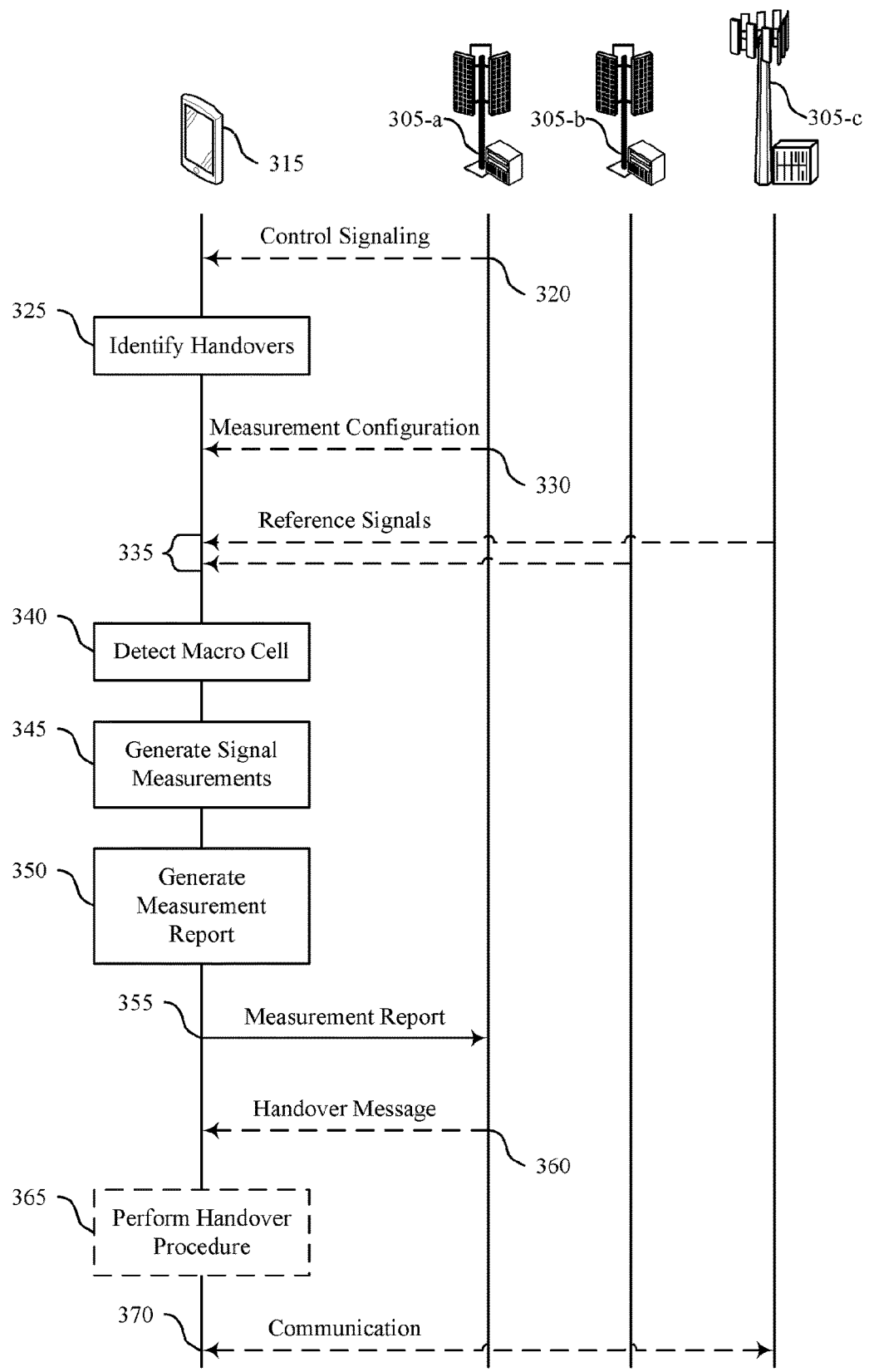
FIG. 3 illustrates an example of a process flow that supports techniques for avoiding frequent handover in small cells in accordance with aspects of the present disclosure.

FIG. 3 illustrates an example of a process flow 300 that supports techniques for avoiding frequent handover in small cells in accordance with aspects of the present disclosure. In some examples, the process flow 300 may implement aspects of wireless communications systems 100 and 200. For example, the process flow 300 may include example operations associated with one or more base stations 305 or a UE 315, which may be examples of the corresponding devices described with reference to FIGS. 1 and 2. In the following description of the process flow 300, the operations between the base stations 305 and the UE 315 may be performed in a different order than the example order shown, or the operations performed by the base stations 305 and the UE 315 may be performed in different orders or at different times. Some operations may also be omitted from the process flow 300, and other operations may be added to the process flow 300. The operations performed by the base stations 305 and the UE 315 may support improvement to the UE 315 handover operations and, in some examples, may promote improvements to efficiency and reliability for communications between the base stations 305 and the UE 315, among other benefits.

In some examples, at 320 the base station 305-*a* may transmit control signaling to the UE 315. The control signaling may indicate a handover threshold, a duration of a time period, an event detection configuration, or any combination thereof. In some examples, the base station 305-*a* may provide communication coverage for the UE 315 via a first small cell. The first small cell may act as serving cell for the UE 315.

At 325, the UE 315 may identify a number of handovers occur within the time period (e.g., 60 seconds). In some examples, the UE 315 may determine that the number of handovers satisfies the handover threshold (e.g., 5 handovers within 60 seconds). In some examples, the UE 315 may determine the handover threshold, the duration of the time period, or both, based on the control signaling. Frequent handovers may increase signaling overhead for the UE 315. For example, signal measurements and measurement reports may reduce a data rate for the UE 315, which may reduce communications reliability and efficiency.

In some examples, at 330 the base station 305-*a* may transmit a measurement configuration to the UE 315. The measurement configuration may indicate which cells the UE 315 is to measure. For example, the measurement configuration may indicate that the UE 315 is to measure a macro cell of a base station 305-*c* and a second small cell of a base station 305-*b*. In some examples, a set of the base stations 305 illustrated in FIG. 3 may represent components of a single base station 305, or each base station 305 may represent a distinct device. In some examples, the measurement configuration may include an aperiodic measurement reporting trigger for the UE 315. Additionally or alternatively, the measurement configuration may include a reporting periodicity for the UE 315, where the UE 315 may be configured to periodically measure cells and report the measurements to the base station 305-*a*.

In some examples, at 335 the UE 315 may receive one or more reference signals transmitted by the base stations 305-*b* and 305-*c*. In some examples, the UE 315 may monitor for the reference signals based on the measurement configuration or the control signaling. For example, the UE 315 may monitor for the reference signals to measure the macro cell and the second small cell based on the aperiodic measurement reporting trigger or the reporting periodicity.

At 340, the UE 315 may detect the macro cell of the base station 305-*c*. The UE 315 may detect the macro cell based on measuring the macro cell during some or all of the handovers within the time period. In some examples, a signal parameter associated with the macro cell may have been inferior to a signal parameter associated with another cell (e.g., the first small cell of the base station 305-*a*) during a previous handover, and so the UE 315 did not perform a handover procedure with the macro cell. In some examples, the UE 315 may detect the macro cell based on the received reference signals.

At 345, the UE 315 may generate signal measurements for the macro cell and the second small cell, for example based on the received reference signals. In some examples, the UE 315 may generate the signal measurements based on detecting an event according to the event detection configuration in the control signaling. Additionally or alternatively, the UE 315 may generate the signal measurements based on the aperiodic measurement reporting trigger or the reporting periodicity indicated in the measurement configuration. In some examples, the UE 315 may measure one or more signal parameters associated with each of the macro cell and the second small cell. The signal parameters may include an RSRP, an RSRQ, an SINR, or another signal quality parameter, or any combination thereof.

At 350, the UE 315 may generate a measurement report based on the signal measurements. Based on identifying the number of handovers occurring in the time period, the UE 315 may determine to omit from the measurement report the signal measurement of the second small cell. In some examples, the UE 315 may determine that one or more signal parameters associated with the macro cell is inferior to corresponding signal parameters associated with the second small cell. Additionally or alternatively, the UE 315 may determine that the signal parameters associated with the macro cell satisfy a signal threshold. That is, the UE 315 may determine that the communication coverage of the macro cell may be sufficient that the macro cell may act as a serving cell for the UE 315. At 355, the UE 315 may transmit the measurement report to the base station 305-*a*, where the measurement report may indicate the signal measurement of the macro cell.

In some examples, at 360 the base station 305-*a* may transmit a message to the UE 315, where the message may indicate that the UE 315 is to handover to the macro cell. In some examples, at 365 the UE 315 may perform a handover procedure with the macro cell based on receiving the message. The handover procedure may include establishing a link with the macro cell. In some examples, the handover procedure may include a random access procedure.

In some examples, at 370 the UE 315 may communicate with the macro cell of the base station 305-*c* after performing the handover procedure. Based on establishing the link, the macro cell may act as a serving cell for the UE 315. The UE 315 may maintain a connection with the macro cell, which may improve data transfer stability and power efficiency at the UE 315, among other benefits. In some examples, at a later time the UE 315 may determine to report a small cell to trigger a handover. For example, the UE 315 may determine a higher data rate is desired for a communication than is supported by the link with the macro cell. Accordingly, the UE 315 may transmit a measurement report indicating a signal measurement of the small cell to initiate a handover procedure.

Figure 4:
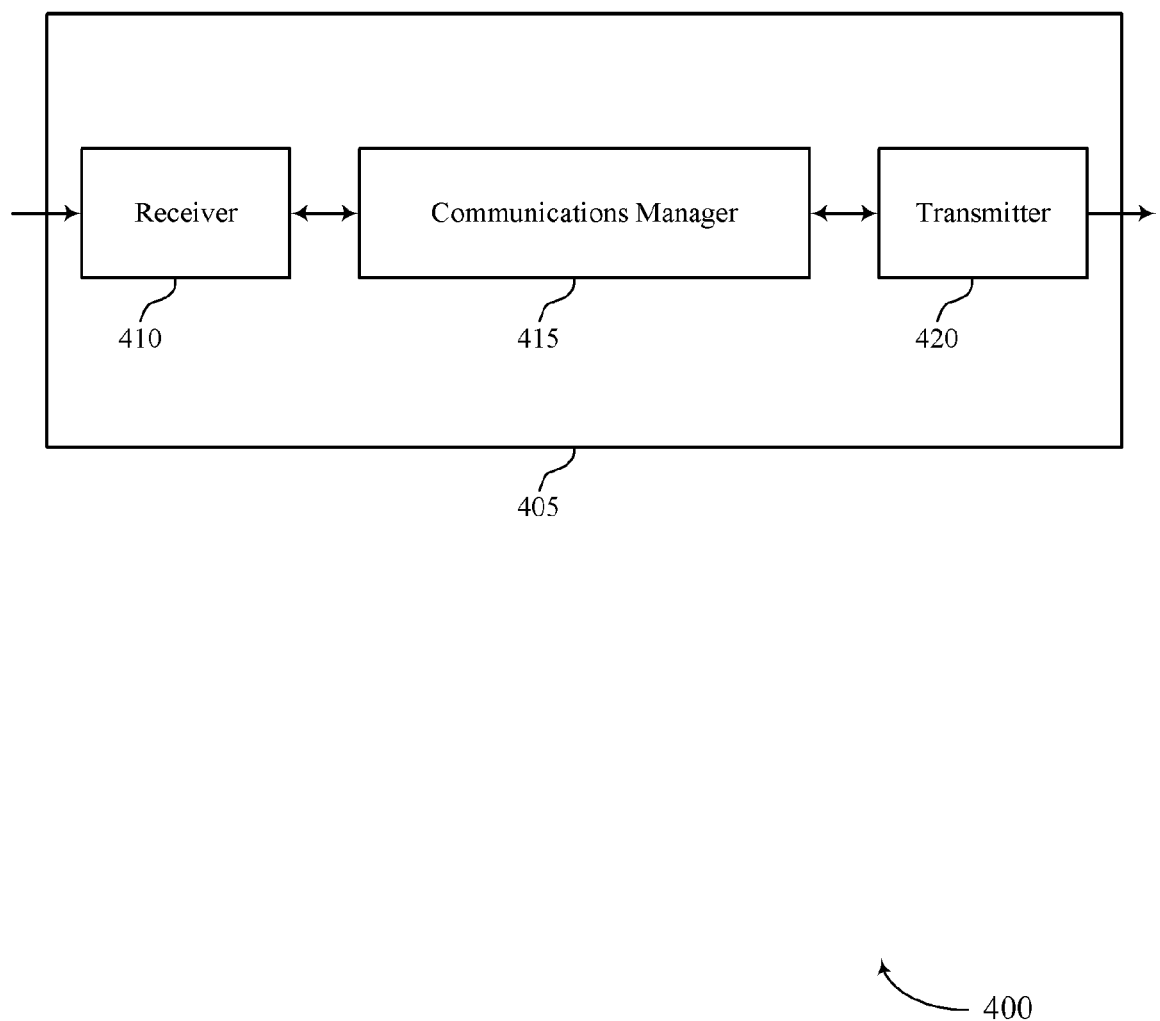
FIGS. 4 and 5 show block diagrams of devices that support techniques for avoiding frequent handover in small cells in accordance with aspects of the present disclosure.

FIG. 4 shows a block diagram 400 of a device 405 that supports techniques for avoiding frequent handover in small cells in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques for avoiding frequent handover in small cells, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may identify a number of handovers of the UE occurring within a time period, detect a macro cell based on measuring the macro cell during a set of the handovers, generate a first signal measurement of the macro cell and a second signal measurement of a second cell, determine to omit reporting of the second signal measurement of the second cell in a measurement report based on the identifying, and transmit the measurement report indicating the first signal measurement of the macro cell based on the determining.

The communications manager 415 as described herein may be implemented to realize one or more potential advantages. One implementation may allow the device 405 to save power and increase battery life by communicating with a base station 105 (as shown in FIG. 1) more efficiently. For example, the device 405 may reduce a signaling load with the base station 105 based on triggering handover to the macro cell rather than continuing to perform handovers to small cells. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal process (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
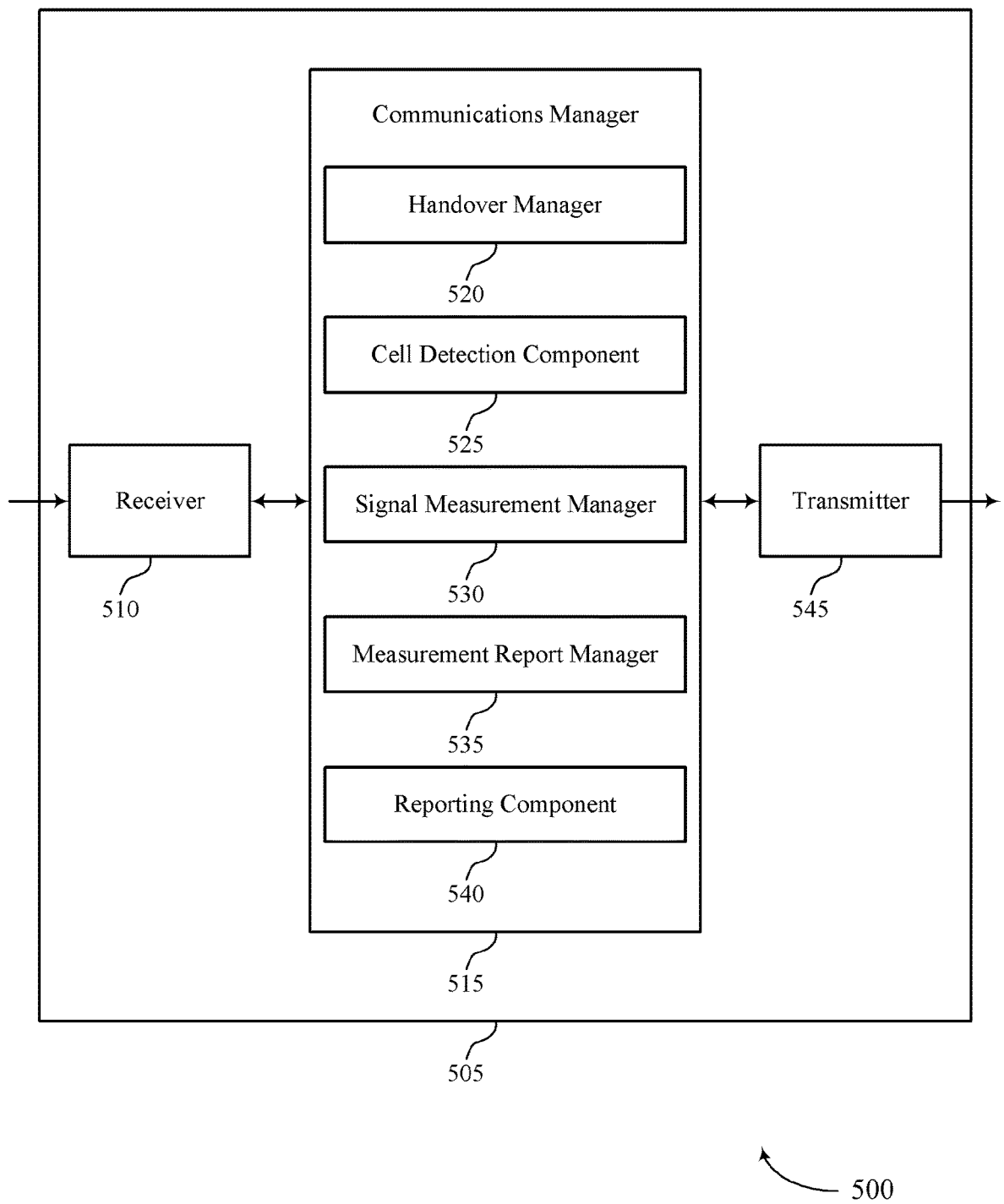

FIG. 5 shows a block diagram 500 of a device 505 that supports techniques for avoiding frequent handover in small cells in accordance with aspects of the present disclosure. The device 505 may be an example of aspects of a device 405, or a UE 115 as described herein. The device 505 may include a receiver 510, a communications manager 515, and a transmitter 545. The device 505 may also include a processor. Each of these components may be in communication with one another (e.g., via one or more buses).

The receiver 510 may receive information such as packets, user data, or control information associated with various information channels (e.g., control channels, data channels, and information related to techniques for avoiding frequent handover in small cells, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a handover manager 520, a cell detection component 525, a signal measurement manager 530, a measurement report manager 535, and a reporting component 540. The communications manager 515 may be an example of aspects of the communications manager 710 described herein.

The handover manager 520 may identify a number of handovers of the UE occurring within a time period. The cell detection component 525 may detect a macro cell based on measuring the macro cell during a set of the handovers. The signal measurement manager 530 may generate a first signal measurement of the macro cell and a second signal measurement of a second cell. The measurement report manager 535 may determine to omit reporting of the second signal measurement of the second cell in a measurement report based on the identifying. The reporting component 540 may transmit the measurement report indicating the first signal measurement of the macro cell based on the determining.

The transmitter 545 may transmit signals generated by other components of the device 505. In some examples, the transmitter 545 may be collocated with a receiver 510 in a transceiver module. For example, the transmitter 545 may be an example of aspects of the transceiver 720 described with reference to FIG. 7. The transmitter 545 may utilize a single antenna or a set of antennas.

Figure 6:
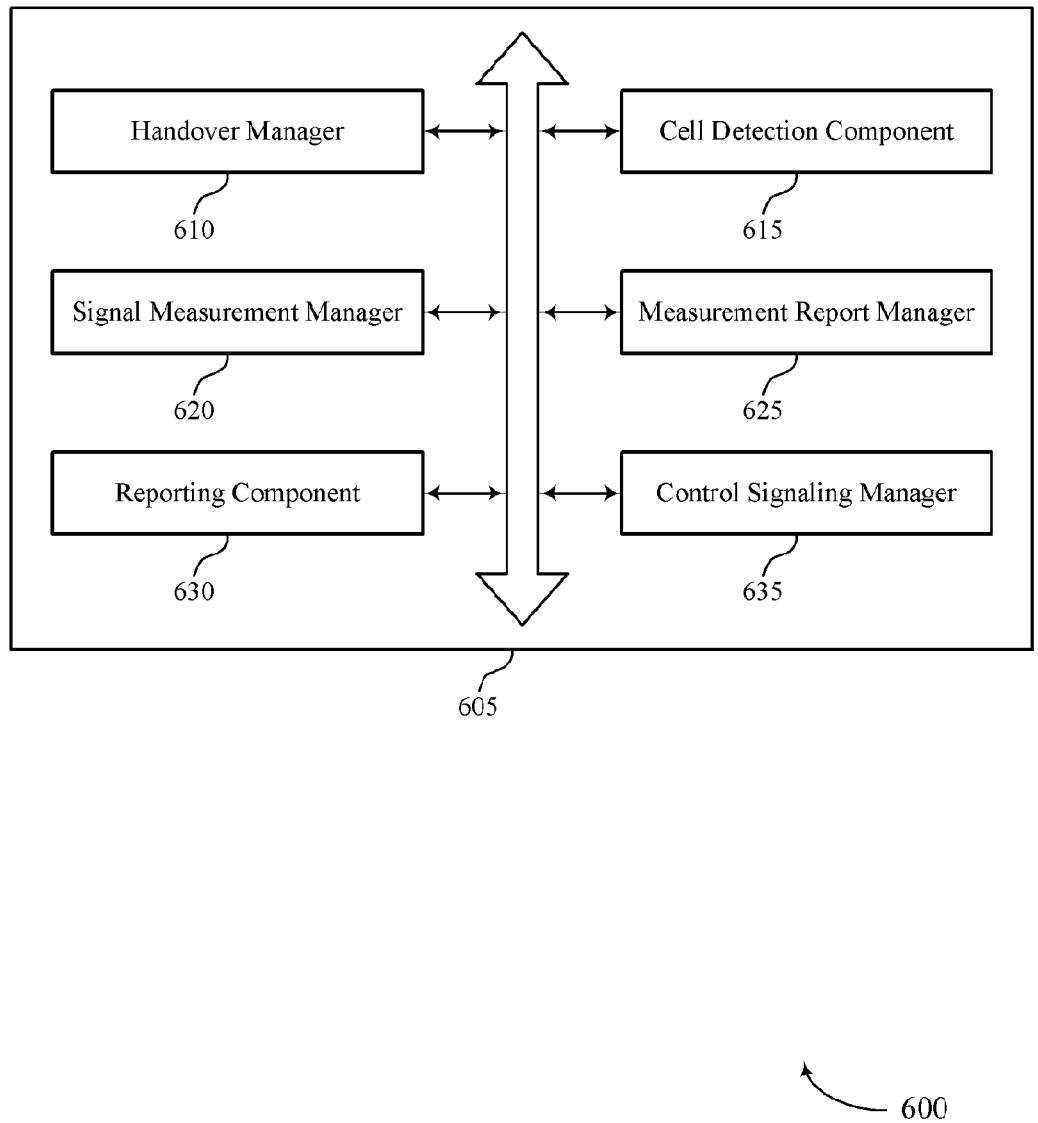
FIG. 6 shows a block diagram of a communications manager that supports techniques for avoiding frequent handover in small cells in accordance with aspects of the present disclosure.

FIG. 6 shows a block diagram 600 of a communications manager 605 that supports techniques for avoiding frequent handover in small cells in accordance with aspects of the present disclosure. The communications manager 605 may be an example of aspects of a communications manager 415, a communications manager 515, or a communications manager 710 described herein. The communications manager 605 may include a handover manager 610, a cell detection component 615, a signal measurement manager 620, a measurement report manager 625, a reporting component 630, and a control signaling manager 635. Each of these modules may communicate, directly or indirectly, with one another (e.g., via one or more buses).

The handover manager 610 may identify a number of handovers of the UE occurring within a time period. In some examples, the handover manager 610 may determine that the number of handovers occurring within the time period satisfies a handover threshold. In some examples, the handover manager 610 may receive a message based on transmitting the measurement report. In some examples, the handover manager 610 may perform a handover procedure with the macro cell based on receiving the message. In some examples, the handover manager 610 may establish a link with the macro cell based on receiving the message. In some examples, the handover manager 610 may identify a handover threshold, a duration of the time period, or both. In some cases, the message includes a radio resource control reconfiguration message. In some cases, the handover procedure includes a random access procedure.

The cell detection component 615 may detect a macro cell based on measuring the macro cell during a set of the handovers. In some examples, the cell detection component 615 may detect the macro cell based on measuring the macro cell during a set of the handovers that satisfy the handover threshold. In some cases, the second cell includes a small cell, a micro cell, or both.

The signal measurement manager 620 may generate a first signal measurement of the macro cell and a second signal measurement of a second cell. In some examples, the signal measurement manager 620 may receive a measurement configuration that indicates the UE is to measure the macro cell and the second cell, where the first signal measurement and the second signal measurement are generated based on the measurement configuration. In some examples, the signal measurement manager 620 may determine, based on generating the first signal measurement and the second signal measurement, that at least one signal parameter associated with the macro cell is inferior to at least one corresponding signal parameter associated with the second cell. In some examples, the signal measurement manager 620 may determine that the at least one signal parameter associated with the macro cell satisfies a signal threshold, where determining to omit reporting of the second signal measurement of the second cell in the measurement report is further based on determining that the at least one signal parameter associated with the macro cell satisfies the signal threshold. In some cases, the first signal measurement or the second signal measurement includes a reference signal received power measurement, a signal to interference plus noise ratio measurement, or both.

The measurement report manager 625 may determine to omit reporting of the second signal measurement of the second cell in a measurement report based on the identifying.

The reporting component 630 may transmit the measurement report indicating the first signal measurement of the macro cell based on the determining. In some examples, the reporting component 630 may identify a reporting periodicity indicated in the measurement configuration, where the measurement report is transmitted based on the reporting periodicity. In some examples, the reporting component 630 may detect an event, where the measurement report is transmitted based on detecting the event. In some examples, the reporting component 630 may receive an aperiodic measurement reporting trigger, where the measurement report is transmitted based on receiving the aperiodic measurement reporting trigger.

In some examples, the control signaling manager 635 may receive control signaling that indicates the handover threshold. In some examples, the control signaling manager 635 may receive control signaling indicating the handover threshold, the duration of the time period, or both. In some examples, the control signaling manager 635 may receive control signaling that indicates an event detection configuration, where the event is detected based on the event detection configuration.

Figure 7:
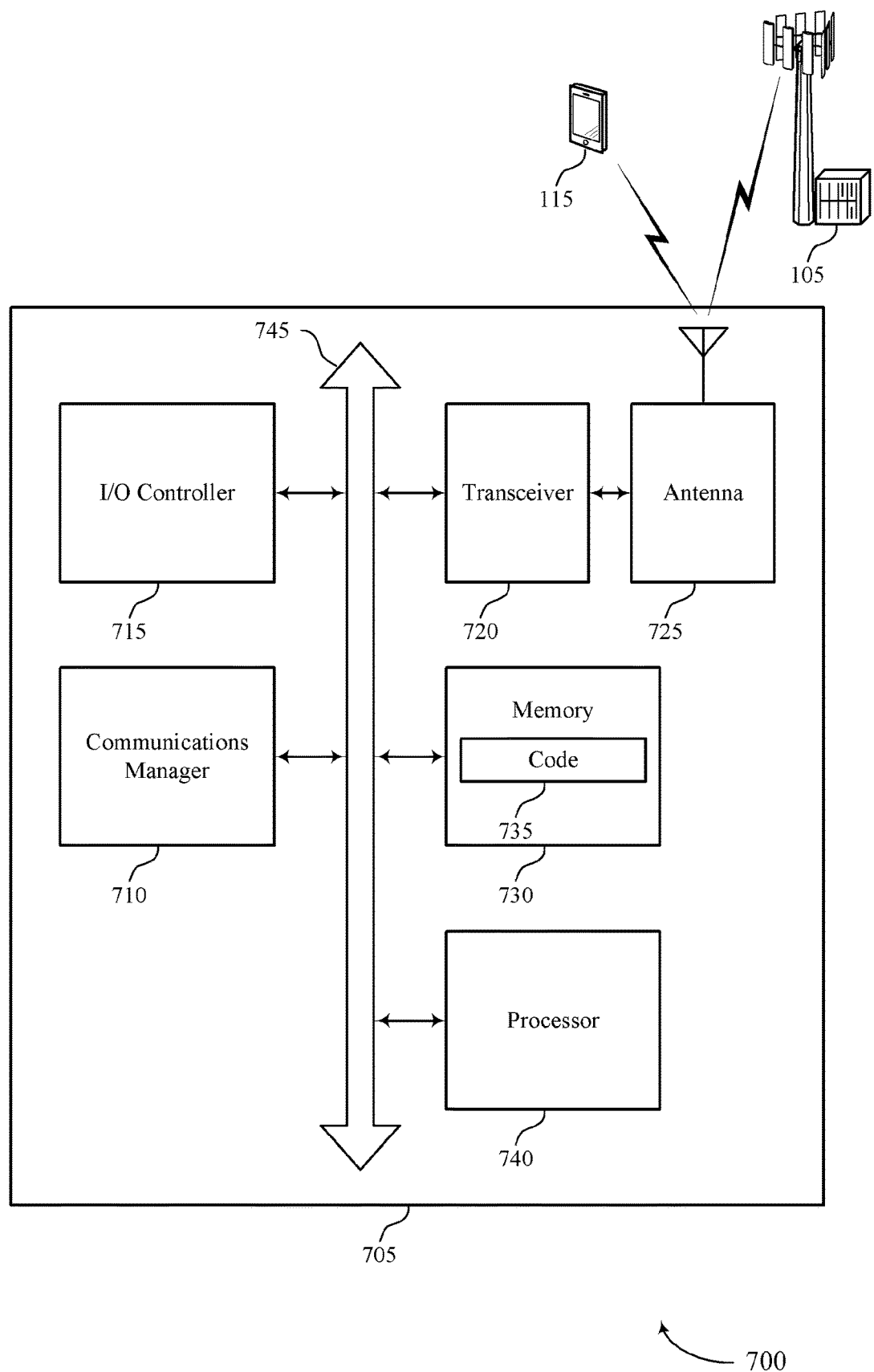
FIG. 7 shows a diagram of a system including a device that supports techniques for avoiding frequent handover in small cells in accordance with aspects of the present disclosure.

FIG. 7 shows a diagram of a system 700 including a device 705 that supports techniques for avoiding frequent handover in small cells in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may identify a number of handovers of the UE occurring within a time period, detect a macro cell based on measuring the macro cell during a set of the handovers, generate a first signal measurement of the macro cell and a second signal measurement of a second cell, determine to omit reporting of the second signal measurement of the second cell in a measurement report based on the identifying, and transmit the measurement report indicating the first signal measurement of the macro cell based on the determining.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for avoiding frequent handover in small cells).

The processor 740 of the device 705 (e.g., controlling the receiver 410, the transmitter 420, or the transceiver 720) may reduce power consumption and increase communications efficiency based on triggering handover to the macro cell. In some examples, the processor 740 of the device 705 may reconfigure parameters for detecting handover conditions and generating signal measurements. For example, the processor 740 of the device 705 may turn on one or more processing units for identifying frequent handovers, increase a processing clock, or a similar mechanism within the device 705.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
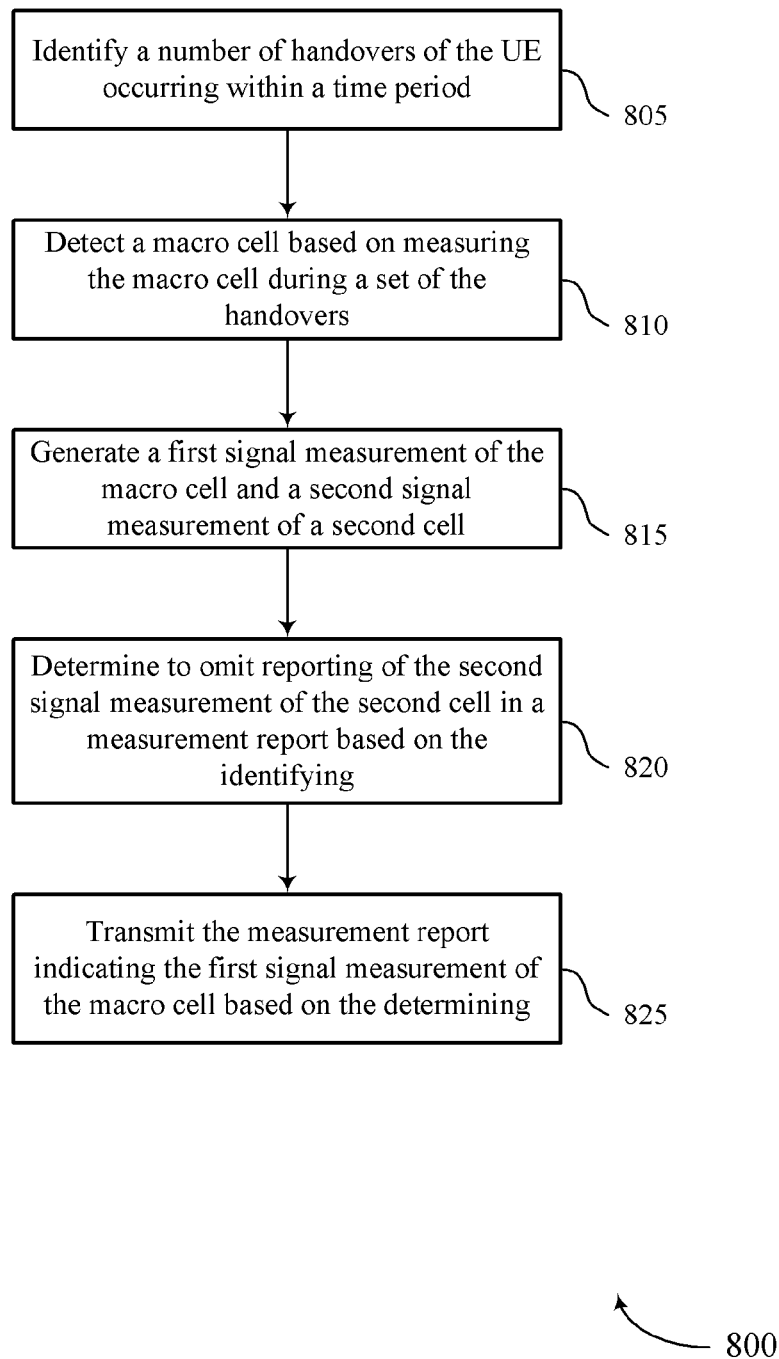
FIGS. 8 through 10 show flowcharts illustrating methods that support techniques for avoiding frequent handover in small cells in accordance with aspects of the present disclosure.

FIG. 8 shows a flowchart illustrating a method 800 that supports techniques for avoiding frequent handover in small cells in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 805, the UE may identify a number of handovers of the UE occurring within a time period. The operations of 805 may be performed according to the methods described herein. In some examples, aspects of the operations of 805 may be performed by a handover manager as described with reference to FIGS. 4 through 7.

At 810, the UE may detect a macro cell based on measuring the macro cell during a set of the handovers. The operations of 810 may be performed according to the methods described herein. In some examples, aspects of the operations of 810 may be performed by a cell detection component as described with reference to FIGS. 4 through 7.

At 815, the UE may generate a first signal measurement of the macro cell and a second signal measurement of a second cell. The operations of 815 may be performed according to the methods described herein. In some examples, aspects of the operations of 815 may be performed by a signal measurement manager as described with reference to FIGS. 4 through 7.

At 820, the UE may determine to omit reporting of the second signal measurement of the second cell in a measurement report based on the identifying. The operations of 820 may be performed according to the methods described herein. In some examples, aspects of the operations of 820 may be performed by a measurement report manager as described with reference to FIGS. 4 through 7.

At 825, the UE may transmit the measurement report indicating the first signal measurement of the macro cell based on the determining. The operations of 825 may be performed according to the methods described herein. In some examples, aspects of the operations of 825 may be performed by a reporting component as described with reference to FIGS. 4 through 7.

Figure 9:
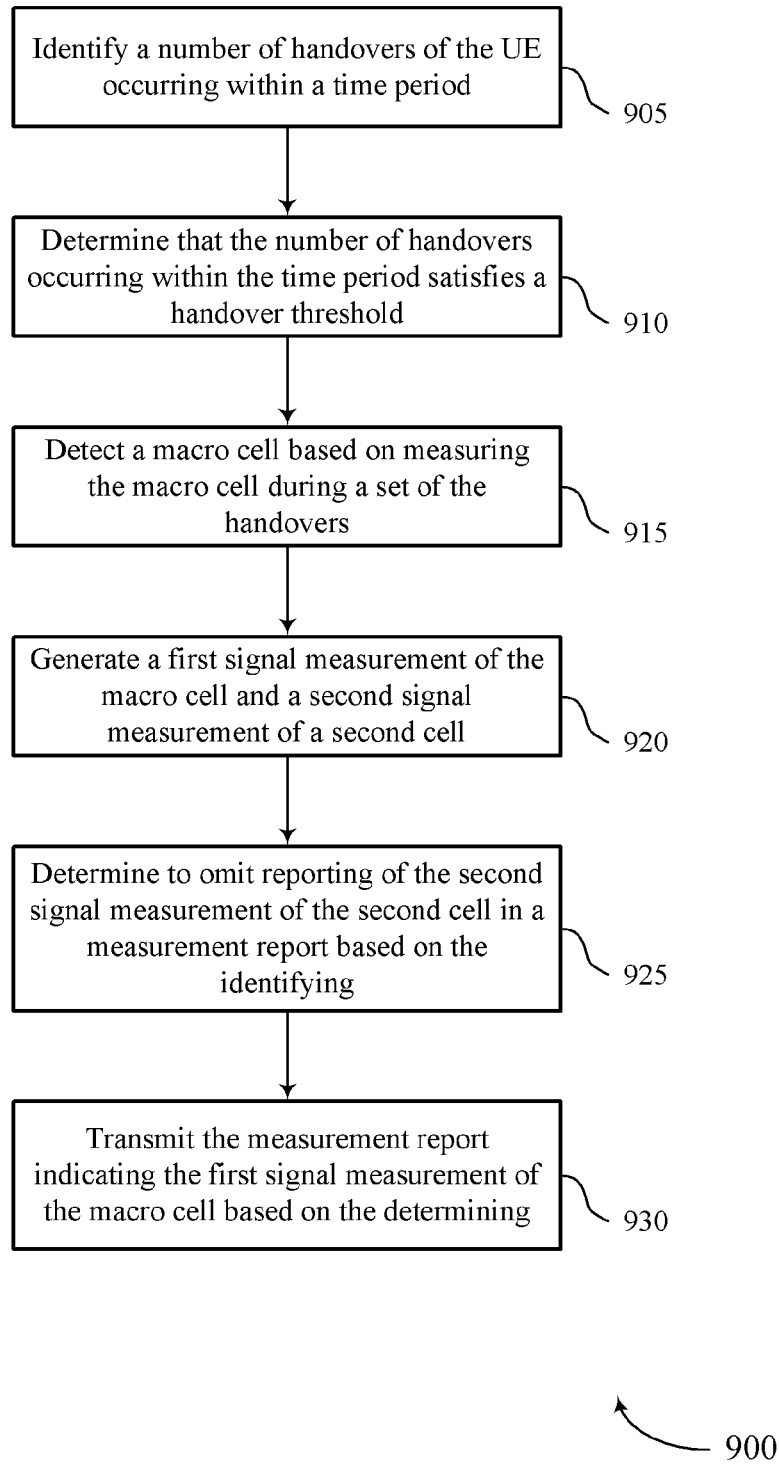

FIG. 9 shows a flowchart illustrating a method 900 that supports techniques for avoiding frequent handover in small cells in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 905, the UE may identify a number of handovers of the UE occurring within a time period. The operations of 905 may be performed according to the methods described herein. In some examples, aspects of the operations of 905 may be performed by a handover manager as described with reference to FIGS. 4 through 7.

At 910, the UE may determine that the number of handovers occurring within the time period satisfies a handover threshold. The operations of 910 may be performed according to the methods described herein. In some examples, aspects of the operations of 910 may be performed by a handover manager as described with reference to FIGS. 4 through 7.

At 915, the UE may detect a macro cell based on measuring the macro cell during a set of the handovers. The operations of 915 may be performed according to the methods described herein. In some examples, aspects of the operations of 915 may be performed by a cell detection component as described with reference to FIGS. 4 through 7.

At 920, the UE may generate a first signal measurement of the macro cell and a second signal measurement of a second cell. The operations of 920 may be performed according to the methods described herein. In some examples, aspects of the operations of 920 may be performed by a signal measurement manager as described with reference to FIGS. 4 through 7.

At 925, the UE may determine to omit reporting of the second signal measurement of the second cell in a measurement report based on the identifying. The operations of 925 may be performed according to the methods described herein. In some examples, aspects of the operations of 925 may be performed by a measurement report manager as described with reference to FIGS. 4 through 7.

At 930, the UE may transmit the measurement report indicating the first signal measurement of the macro cell based on the determining. The operations of 930 may be performed according to the methods described herein. In some examples, aspects of the operations of 930 may be performed by a reporting component as described with reference to FIGS. 4 through 7.

Figure 10:
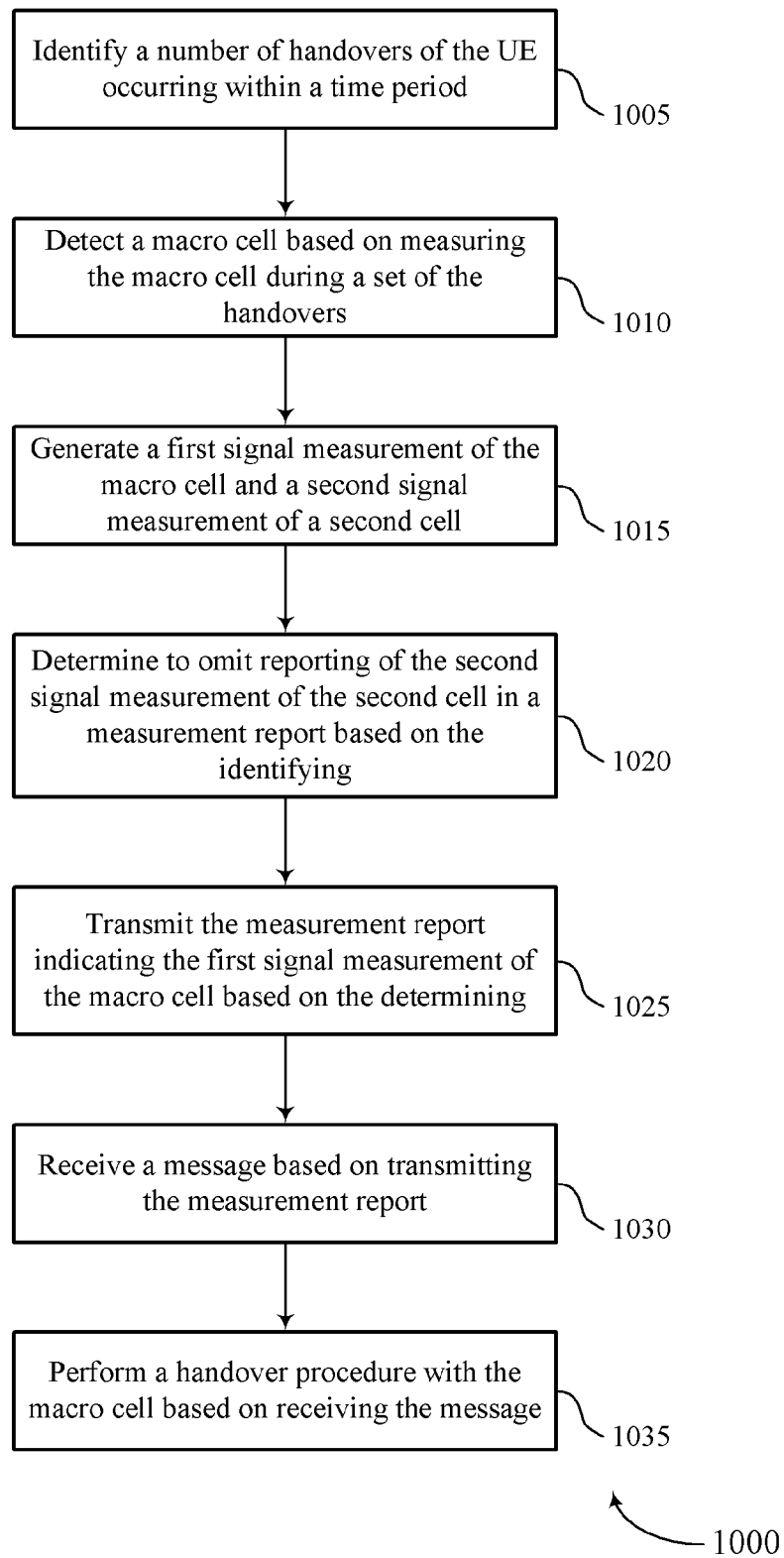

FIG. 10 shows a flowchart illustrating a method 1000 that supports techniques for avoiding frequent handover in small cells in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1005, the UE may identify a number of handovers of the UE occurring within a time period. The operations of 1005 may be performed according to the methods described herein. In some examples, aspects of the operations of 1005 may be performed by a handover manager as described with reference to FIGS. 4 through 7.

At 1010, the UE may detect a macro cell based on measuring the macro cell during a set of the handovers. The operations of 1010 may be performed according to the methods described herein. In some examples, aspects of the operations of 1010 may be performed by a cell detection component as described with reference to FIGS. 4 through 7.

At 1015, the UE may generate a first signal measurement of the macro cell and a second signal measurement of a second cell. The operations of 1015 may be performed according to the methods described herein. In some examples, aspects of the operations of 1015 may be performed by a signal measurement manager as described with reference to FIGS. 4 through 7.

At 1020, the UE may determine to omit reporting of the second signal measurement of the second cell in a measurement report based on the identifying. The operations of 1020 may be performed according to the methods described herein. In some examples, aspects of the operations of 1020 may be performed by a measurement report manager as described with reference to FIGS. 4 through 7.

At 1025, the UE may transmit the measurement report indicating the first signal measurement of the macro cell based on the determining. The operations of 1025 may be performed according to the methods described herein. In some examples, aspects of the operations of 1025 may be performed by a reporting component as described with reference to FIGS. 4 through 7.

At 1030, the UE may receive a message based on transmitting the measurement report. The operations of 1030 may be performed according to the methods described herein. In some examples, aspects of the operations of 1030 may be performed by a handover manager as described with reference to FIGS. 4 through 7.

At 1035, the UE may perform a handover procedure with the macro cell based on receiving the message. The operations of 1035 may be performed according to the methods described herein. In some examples, aspects of the operations of 1035 may be performed by a handover manager as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
   identifying a number of handovers of the UE occurring within a time period;
   detecting a macro cell based at least in part on measuring the macro cell during a plurality of the handovers;
   generating a first signal measurement of the macro cell and a second signal measurement of a second cell;
   determining to omit reporting of the second signal measurement of the second cell in a measurement report based at least in part on the identifying and the first signal measurement of the macro cell satisfying a signal strength threshold; and
   transmitting the measurement report indicating the first signal measurement of the macro cell based at least in part on the determining.

2. The method of claim 1, further comprising:
   determining that the number of handovers occurring within the time period satisfies a handover threshold.

3. The method of claim 2, further comprising:
   receiving control signaling that indicates the handover threshold.

4. The method of claim 2, wherein detecting the macro cell comprises:
   detecting the macro cell based at least in part on measuring the macro cell during a plurality of the handovers that satisfy the handover threshold.

5. The method of claim 1, further comprising:
   receiving a message based at least in part on transmitting the measurement report; and
   performing a handover procedure with the macro cell based at least in part on receiving the message.

6. The method of claim 5, wherein performing the handover procedure comprises:
   establishing a link with the macro cell based at least in part on receiving the message.

7. The method of claim 5, wherein the message comprises a radio resource control reconfiguration message.

8. The method of claim 5, wherein the handover procedure comprises a random access procedure.

9. The method of claim 1, further comprising:
   identifying a handover threshold, a duration of the time period, or both.

10. The method of claim 9, further comprising:
    receiving control signaling indicating the handover threshold, the duration of the time period, or both.

11. The method of claim 1, further comprising:
    receiving a measurement configuration that indicates the UE is to measure the macro cell and the second cell, wherein the first signal measurement and the second signal measurement are generated based at least in part on the measurement configuration.

12. The method of claim 11, further comprising:
    identifying a reporting periodicity indicated in the measurement configuration, wherein the measurement report is transmitted based at least in part on the reporting periodicity.

13. The method of claim 1, further comprising:
    detecting an event, wherein the measurement report is transmitted based at least in part on detecting the event.

14. The method of claim 13, further comprising:
    receiving control signaling that indicates an event detection configuration, wherein the event is detected based at least in part on the event detection configuration.

15. The method of claim 1, further comprising:
    receiving an aperiodic measurement reporting trigger, wherein the measurement report is transmitted based at least in part on receiving the aperiodic measurement reporting trigger.

16. The method of claim 1, further comprising:
    determining, based at least in part on generating the first signal measurement and the second signal measurement, that at least one signal parameter associated with the macro cell is inferior to at least one corresponding signal parameter associated with the second cell.

17. The method of claim 1, wherein the first signal measurement or the second signal measurement comprises a reference signal received power measurement, a signal to interference plus noise ratio measurement, or both.

18. The method of claim 1, wherein the second cell comprises a small cell, a micro cell, or both.

19. An apparatus for wireless communication by a user equipment (UE), comprising:
    one or more processors,
    one or more memories coupled with the one or more processors; and
    instructions stored in the one or more memories and executable by the one or more processors to cause the apparatus to:
    identify a number of handovers of the UE occurring within a time period;
    detect a macro cell based at least in part on measuring the macro cell during a plurality of the handovers;
    generate a first signal measurement of the macro cell and a second signal measurement of a second cell;
    determine to omit reporting of the second signal measurement of the second cell in a measurement report based at least in part on the identifying and the first signal measurement of the macro cell satisfying a signal strength threshold; and
    transmit the measurement report indicating the first signal measurement of the macro cell based at least in part on the determining.

20. The apparatus of claim 19, wherein the instructions are further executable by the one or more processors to cause the apparatus to:
    determine that the number of handovers occurring within the time period satisfies a handover threshold.

21. The apparatus of claim 20, wherein the instructions are further executable by the one or more processors to cause the apparatus to:
    receive control signaling that indicates the handover threshold.

22. The apparatus of claim 20, wherein the instructions to detect the macro cell are executable by the one or more processors to cause the apparatus to:
    detect the macro cell based at least in part on measuring the macro cell during a plurality of the handovers that satisfy the handover threshold.

23. The apparatus of claim 19, wherein the instructions are further executable by the one or more processors to cause the apparatus to:
- receive a message based at least in part on transmitting the measurement report; and
- perform a handover procedure with the macro cell based at least in part on receiving the message.

24. The apparatus of claim 23, wherein the instructions to perform the handover procedure are executable by the one or more processors to cause the apparatus to:
- establish a link with the macro cell based at least in part on receiving the message.

25. The apparatus of claim 23, wherein the message comprises a radio resource control reconfiguration message.

26. The apparatus of claim 23, wherein the handover procedure comprises a random access procedure.

27. The apparatus of claim 19, wherein the instructions are further executable by the one or more processors to cause the apparatus to:
- identify a handover threshold, a duration of the time period, or both.

28. The apparatus of claim 27, wherein the instructions are further executable by the one or more processors to cause the apparatus to:
- receive control signaling indicating the handover threshold, the duration of the time period, or both.

29. The apparatus of claim 19, wherein the instructions are further executable by the one or more processors to cause the apparatus to:
- receive a measurement configuration that indicates the UE is to measure the macro cell and the second cell, wherein the first signal measurement and the second signal measurement are generated based at least in part on the measurement configuration.

30. The apparatus of claim 29, wherein the instructions are further executable by the one or more processors to cause the apparatus to:
- identify a reporting periodicity indicated in the measurement configuration, wherein the measurement report is transmitted based at least in part on the reporting periodicity.

31. The apparatus of claim 19, wherein the instructions are further executable by the one or more processors to cause the apparatus to:
- detect an event, wherein the measurement report is transmitted based at least in part on detecting the event.

32. The apparatus of claim 31, wherein the instructions are further executable by the one or more processors to cause the apparatus to:
- receive control signaling that indicates an event detection configuration, wherein the event is detected based at least in part on the event detection configuration.

33. An apparatus for wireless communication by a user equipment (UE), comprising:
- means for identifying a number of handovers of the UE occurring within a time period;
- means for detecting a macro cell based at least in part on measuring the macro cell during a plurality of the handovers;
- means for generating a first signal measurement of the macro cell and a second signal measurement of a second cell;
- means for determining to omit reporting of the second signal measurement of the second cell in a measurement report based at least in part on the identifying and the first signal measurement of the macro cell satisfying a signal strength threshold; and
- means for transmitting the measurement report indicating the first signal measurement of the macro cell based at least in part on the determining.

34. A non-transitory computer-readable medium storing code for wireless communication by a user equipment (UE), the code comprising instructions executable by a processor to:
- identify a number of handovers of the UE occurring within a time period;
- detect a macro cell based at least in part on measuring the macro cell during a plurality of the handovers;
- generate a first signal measurement of the macro cell and a second signal measurement of a second cell;
- determine to omit reporting of the second signal measurement of the second cell in a measurement report based at least in part on the identifying and the first signal measurement of the macro cell satisfying a signal strength threshold; and
- transmit the measurement report indicating the first signal measurement of the macro cell based at least in part on the determining.

* * * * *